Jan. 12, 1954   P. B. MacCREADY, JR   2,665,940
ROBOT CLOUD SEEDING GENERATOR
Filed Oct. 8, 1951                                     3 Sheets-Sheet 2
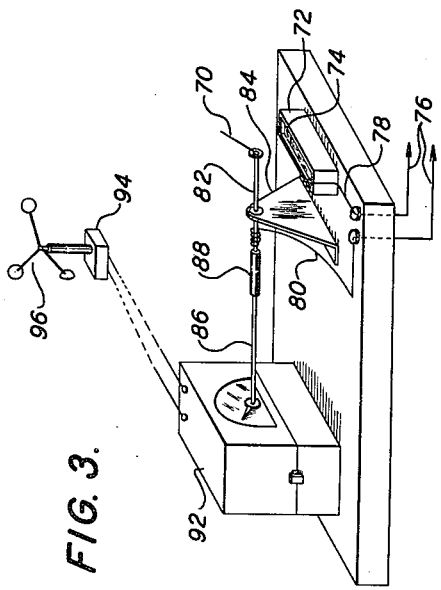
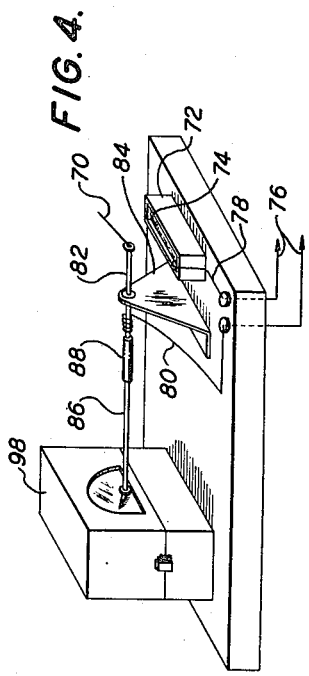
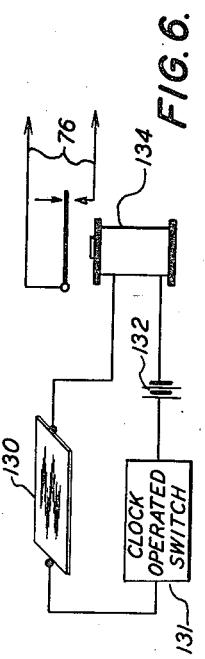
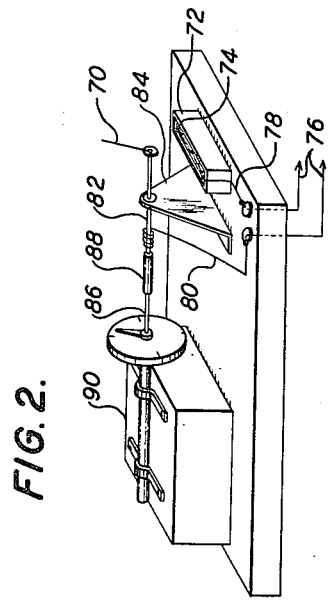
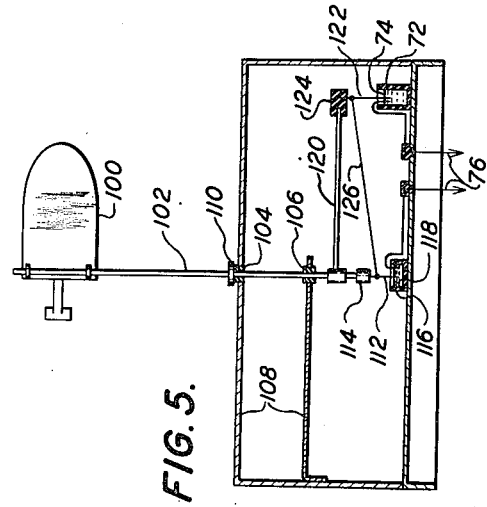
INVENTOR.
PAUL B. MacCREADY, JR.
BY
James B. Christie
ATTORNEY

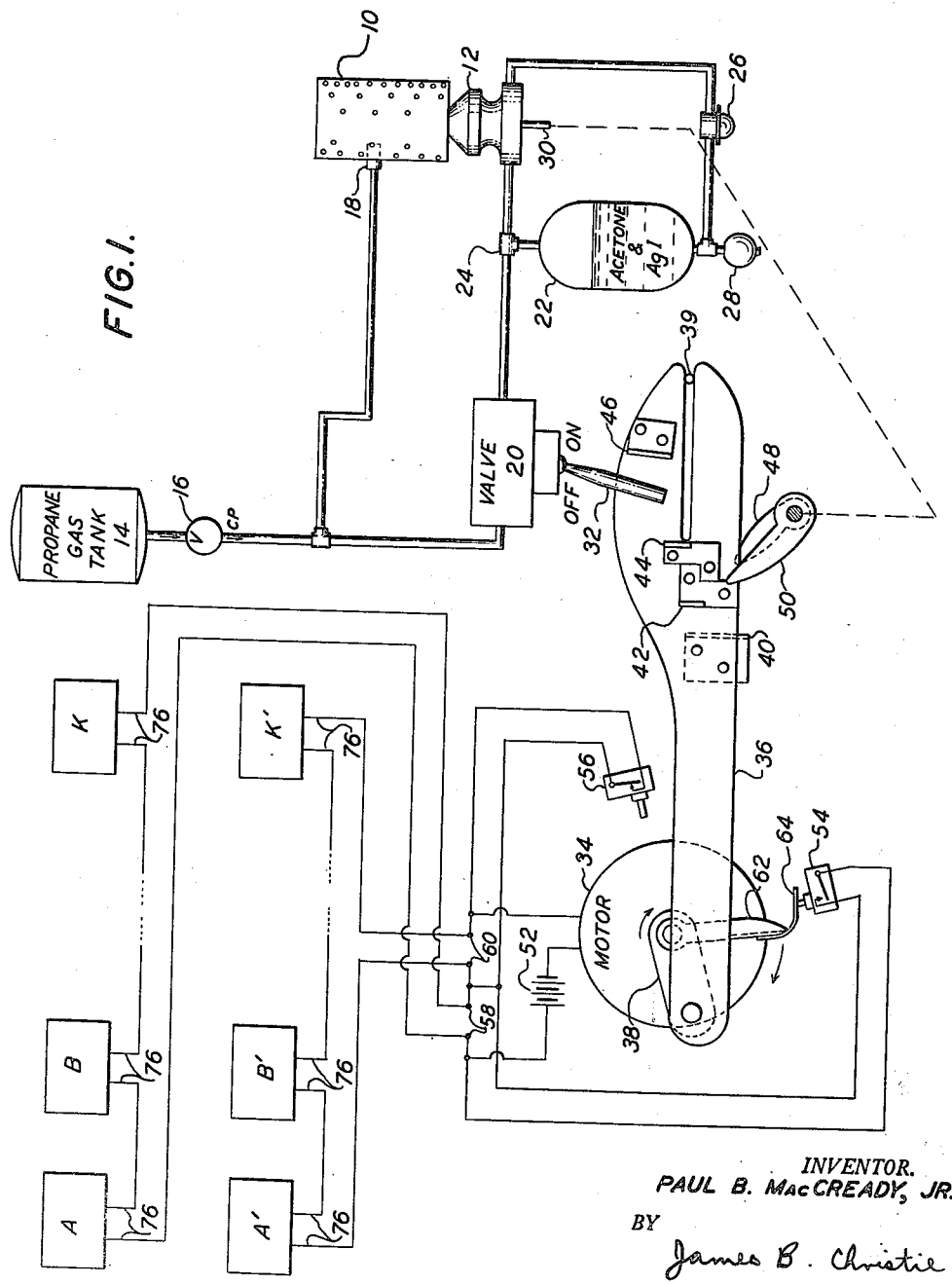

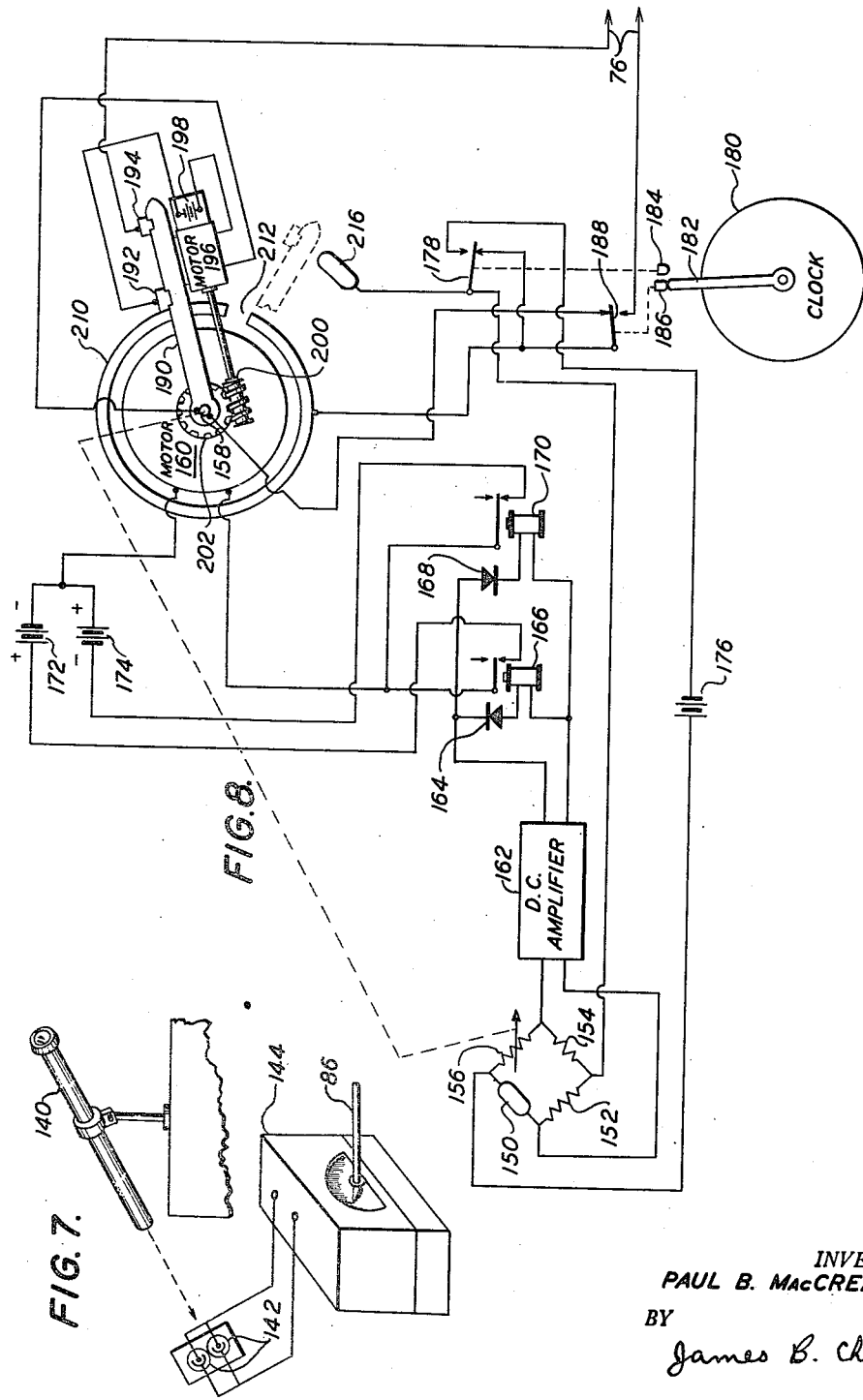

Patented Jan. 12, 1954

2,665,940

UNITED STATES PATENT OFFICE 2,665,940

ROBOT CLOUD SEEDING GENERATOR

Paul B. MacCready, Jr., Pasadena, Calif.

Application October 8, 1951, Serial No. 250,336

18 Claims. (Cl. 299—28)

The invention relates to automatic apparatus which is responsive to meteorological conditions for controlling the operation of generators for producing cloud seeding nuclei.

Heretofore cloud seeding generators have been manually operated by an attendant located at the generator. When several cloud seeding generators are employed at strategic locations, an operator is required for each generator and it is difficult to determine when the generators should be turned on and off since the operator must rely to some extent upon meteorological information which must be conveyed to the operator from a meteorological station. Also, such an arrangement does not readily permit the generators to be located in inaccessible places.

These difficulties are minimized in the cloud seeding generators of the present invention by providing compact cloud seeding generators which may be left unattended and which are turned on and off automatically by apparatus which is responsive to meteorological conditions.

In accordance with the invention each cloud seeding generator is provided with a plurality of sensing devices which are responsive to meteorological parameters (such as the humidity, the velocity and direction of the wind, the amount of light, etc.), and which sensing devices serve to provide electrical conditions which serve to turn the cloud seeding generator on when the meteorological conditions are favorable for rain making and to turn the cloud seeding generator off when the meteorological conditions are not favorable for rain making.

If desired, some of the sensing devices may be of a type which provide a control action only in responsive to changes in meterological conditions over predetermined periods of time.

The invention will be fully understood from the following description and the drawings, in which:

Fig. 1 is a schematic diagram of a preferred embodiment of the invention; and

Figs. 2 to 8 show various devices for sensing meteorological conditions which may be employed in the apparatus shown in Fig. 1.

In Fig. 1, the apparatus for producing the cloud seeding nuclei is a silver iodide generator which produces smoke by burning a sprayed acetone solution of silver iodide in a propane flame.

A flame holder 10 is employed to produce the cloud seeding smoke, and the propane gas and the silver iodide solution are applied to the flame holder through a nozzle 12 which may be a conventional paint sprayer nozzle, for example. A tank 14 serves to contain the propane gas, and a valve 16 serves to provide the apparatus with gas at a constant pressure. The output of the valve 16 is connected directly to a pilot light holder 18, and to the nozzle 12 through a valve 20 which serves to control the flow of the propane gas to the nozzle 12.

A tank 22 serves to contain the acetone solution of silver iodide, and the upper portion of the tank 22 is connected to the propane gas system through a tee 24 so that the tank 22 is pressurized by the pressure of the propane gas. The acetone solution of silver iodide is supplied to the nozzle 12 through a filter 26, and a sump 28 is provided at the base of the tank 22 for further purifying the solution.

The nozzle 12 is provided with a control shaft 30 which serves to control the flow of the silver iodide solution through a needle valve in the nozzle 12. The valve 20 is provided with a toggle shaft 32 which serves to turn the propane gas on or off.

The operating sequence of the smoke generator is as follows: The propane gas is turned on by means of the toggle shaft 32 and the gas is ignited by the pilot 18, a needle valve in the nozzle 12 is opened wide by means of the control shaft 30 so as to clean the nozzle and provide an even flow of the silver iodide solution, and then the needle valve is partially closed by means of the control shaft 30 so that the needle valve is approximately one-half open.

When the smoke generator is turned off, the sequence of operations is as follows: The needle valve which controls the flow of the silver iodide solution is closed completely by means of the shaft 30, and then the propane gas is turned off by means of the toggle shaft 32.

These operations are accomplished by means of a motor 34 which drives a control arm 36 at a slow speed by means of a crank 38 which is connected by gears to the armature of the motor. For example, the motor 34 may cause the crank 38 to make one-half of a revolution, per minute.

The control arm 36 is provided with a slot which straddles a fixed pin 39, so that the arm 36 is free to move back and forth and so that the end of the arm 36 which is connected to the crank 38 can move up and down.

Four lugs 40, 42, 44 and 46, which are mounted on the control arm 36 serve to actuate the toggle shaft 32 and the control shaft 30 of the needle valve in the nozzle at appropriate times so as to accomplish the sequence of operations described above. The lugs 44 and 46 serve to move the toggle shaft 32 and thereby turn the valve 28 on and off. The lugs 40 and 42 serve to contact the respective cams 48 and 50, which are rigidly attached to the shaft 30 of the needle valve, and thereby serve to control the flow of the silver iodide solution into the nozzle 12.

The portion of the cloud seeding generating apparatus which is described above is disclosed in my co-pending application Serial No. 244,879, filed September 4, 1951.

The control apparatus for turning the cloud seeding generator on and off comprises two sets of sensing devices, A to K and A' to K', which are respectively connected in shunt with a pair of normally closed switches 54 and 56. A battery 52 is connected to the winding of the motor 34 through the circuit which includes the switches 54 and 56 and the two sets of sensing devices so that the motor 34 is turned on or off when predetermined meteorological conditions exist.

Each of the sets of sensing devices A to K and A' to K' may employ one or more sensing devices. For convenience, three sensing devices are shown in each of the sets disclosed in Fig. 1; however, it will be understood that any number of the sensing devices may be employed. Preferably each of the sensing devices is arranged so that it may be easily connected to or disconnected from the circuit, thereby facilitating the substitution of different types of sensing devices so that various combinations of sensing devices may be employed, if desired. If it is desired to remove one or more of the sensing devices in one set, each sensing device which is removed may be replaced by a short circuit without affecting the operation of the remaining sensing devices.

The set of sensing devices A to K are connected in series with one another, and the serially connected sensing devices are connected in shunt with the switch 54 at the terminals 58.

The set of sensing devices A' to K' are likewise connected in series with one another and the serially connected sensing devices are connected in shunt with the switch 56 at the terminals 60.

The sets of sensing devices are arranged so that a short circuit is provided across the terminals 58 when meteorological conditions are favorable for rain making and so that a short circuit is provided across the terminals 60 when meteorological conditions are unfavorable for rain making.

A crank 62, which is rigidly attached to the armature of the motor 34 and which carries a spring extension 64, serves to operate the switches 54 and 56. The switches 54 and 56 are normally closed, and the electrical circuit which connects the battery 52 to the motor 34 is arranged so that when the two sets of sensing devices provide open circuits across the terminals 58 and 60, the motor 34 is de-energized whenever either of the switches 54 or 56 is open. When the switch 54 is open and the switch 56 is closed, the motor 34 is energized when the terminals 58 are short circuited by the sensing devices A to K, and the motor continues to be energized until the switch 56 is opened. When the switch 56 is opened and the switch 54 is closed, the motor is energized when the terminals 60 are short circuited by the sensing devices A' to K', and the motor continues to be energized until the switch 54 is opened.

As shown in Fig. 1, the generator for producing cloud seeding nuclei is turned off and it will remain off until meteorological conditions cause the set of sensing devices A to K to provide a short circuit across the terminals 58. The short circuit across the terminals 58 serves to complete the circuit between the battery 52 and the motor 34 so that the motor is energized and the crank 62 is caused to move in a clockwise direction. When the extension 64 on the crank 62 moves so that it is no longer in contact with the control button of the switch 54, the switch 54 provides a short circuit and the motor will continue to be energized until the extension 64 operates the control button of the switch 56.

As the cranks 62 and 38 are moved in a clockwise direction by the armature of the motor 34, the control arm 36 is caused to move to the right and the lug 44 serves to move the toggle shaft 32 to the "on" position, and then the lug 44 slips past the arm 32. Shortly thereafter the lug 40 contacts the cam 48 and starts opening the needle valve in the nozzle 12 by moving the control shaft 30. When the crank 38 has moved about one-half of a revolution, the needle valve is completely open, and as the crank 38 continues to rotate the lug 42 contacts the cam 50 and begins closing the needle valve. After the crank 38 is moved about three-fourths of a revolution, the needle valve is about half on, and then the extension 64 on the crank 62 contacts the control button on the switch 56 and causes the switch to open, thereby stopping the motor 34 and causing the generating apparatus to remain turned on.

The generator is maintained in this condition until meteorological conditions cause the set of sensing devices A' to K' to provide a short circuit across the terminals 60, whereupon the motor 34 is again energized and the motor causes the extension 64 on the crank 62 to move beyond the control button of the switch 56. As the crank 38 is caused to move in a clockwise direction the control arm 36 serves to close the needle valve by means of the rotation of the cam 50 by the lug 42. After the needle valve which controls the flow of the silver iodide solution is fully closed, the lug 46 contacts the toggle shaft 32 and causes the valve 28 to be turned off. When the extension 64 of the crank 62 contacts the control button on the switch 54 and causes the switch contacts to open, the motor 34 is de-energized and the apparatus remains in this condition until meteorological conditions again cause the set of sensing devices A to K to provide a short circuit across the terminals 58.

Various types of sensing elements may be employed as the elements A to K and A' to K' shown in block diagrammatic form in Fig. 1. Each of the sensing elements may be arranged to respond to more than one range of values of a meteorological parameter, if desired. Also, it will be apparent that two or more sets of sensing elements may be connected across the terminals 58 or across the terminals 60 if it is desired to control the operation of the cloud seeding generator by a plurality of predetermined groups of meteorological parameters.

Figs. 2 to 8 show various types of sensing devices which may be employed as the elements A to K and A' to K' shown in Fig. 1. Each of the sensing devices consists of a meteorological sensing element which causes a short circuit to be provided across the outlet wires of the sensing device when the meteorological parameter under consideration is within a certain range of values. When all of the sensing devices of one of the sets provide short circuits, the terminals 58 or 60, as the case may be, are short circuited thereby.

In the apparatus shown in Figs. 2 to 4, a rotatable conductive wire 70 and a box 72 containing some mercury 74 serve as a means for providing a short circuit across the outlet wires 76 when the meteorological parameter to which the sensing device responds is within predetermined limits. One of the outlet wires is connected to a conductor 78 which is permanently located in the mercury bath. The other outlet wire is connected to a wire 80 which is wrapped around a conductive shaft 82 so as to provide an electrical connection between the two. The shaft 82 is rotatably supported by means of a bearing in a supporting member 84, and the shaft 82 is connected to another shaft 86 by means of an insulator 88.

In the apparatus shown in Fig. 2, the shaft 86 is rotated by a temperature indicator 90 which may be a conventional aircraft air temperature indicator, for example.

In the apparatus shown in Fig. 3 the shaft 86 is rotated by means of an ammeter 92 which in turn is actuated by a generator 94 which is powered by a cup anemometer 96.

In the apparatus shown in Fig. 4 the shaft 86 is rotated by means of a humidity indicator 98, which may be a conventional type.

The apparatus shown in Fig. 5 serves to provide a short circuit across the outlet wires 76 when the wind direction is within predetermined limits. A wind direction vane 100 is connected to a shaft 102 which is supported by bearings 104 and 106 which in turn are supported by a framework 108. A washer 110, which is rigidly secured to the shaft 102, serves to secure the shaft 102 in the desired vertical position. At the base of the shaft 102 a conducting wire 112 is connected to the shaft by means of an insulator 114. A box 116 which contains a mercury bath 118 provides an electrical connection between one of the outlet wires 76 and the rotatable wire 112. A shaft 120 is rigidly connected to the shaft 102, and another conductive wire 122 is secured to the shaft 120 by means of an insulator 124. The wire 122 is flexible so that it may be moved over the ends of the box 72 without being permanently bent. The wires 112 and 122 are connected by means of a conductor 126. The other outlet wire 76 is fixedly located within the mercury bath 74 so that the conductive wire 122 serves to complete a short circuit between the outlet wires 76 when the conductive wire 122 is within the mercury bath 74.

The apparatus shown in Fig. 6 is responsive to the amount of moisture in the air. The member 130 is a paper sheet impregnated with salt and it is connected in series with a clock operated switch 131 and a battery 132 across the winding of a relay 134. The clock operated switch 131 serves to connect the battery 132 to the member 130 during predetermined periods such as during one or two mintues of each hour, thereby minimizing the current drain from the battery 132. It will be apparent that the switch 131 may be omitted and then the battery 132 is directly connected to the member 130, if continuous operation of the sensing device is desired.

The armature of the relay 134 serves to provide a short circuit across the outlet wires 76 during the periods when the switch 131 is operated and the moisture content of the air is sufficient to cause the member 130 to conduct sufficient current to operate the relay 134.

The apparatus shown in Fig. 7 is responsive to the amount of light which strikes the apparatus from a selected direction. A telescope 140 serves to focus light from a selected direction on a pair of photocells 142. The photocells may be the type which are employed in photographic meters, for example. The output of the photocells 142 is supplied to a meter 144 which serves to control the angular position of a shaft 86. The shaft 86 is employed to control apparatus for providing a short circuit in the manner shown in Figs. 2 to 4.

The apparatus shown in Fig. 8 serves to provide a short circuit across the output leads 76 when a meteorological variable changes a predetermined amount during a certain period of time.

The control element of the sensing device is a resistance element 150 which serves to provide a resistance which varies in accordance with variations in the meteorological parameter being observed. For example, the element 150 may provide a change in resistance which varies in accordance with changes in temperature or in accordance with changes in humidity. Two fixed resistors 152 and 154, which have substantially equal resistances, an adjustable resistor 156, and the resistance element 150 are connected in series in a closed loop to form a bridge circuit. Preferably, the adjustable resistor 156 is a potentiometer having a rotatable control member.

The member for controlling the resistance of the resistor 156 is directly connected to the armature 158 of a motor 160, and the motor 160 serves to control the resistance of the adjustable resistor 156 so that its resistance is substantially the same as that of element 150 when the apparatus is energized.

The output of the bridge is applied to the input circuit of a D. C. amplifier 162, and the output of the amplifier 162 is applied to a first diode 164 and a relay 166 which are connected in series, and to a second diode 168 and a relay 170 which are also connected in series. The diodes 164 and 168 are connected to the output of the amplifier 162 in opposite polarity so that the relay 166 is caused to operate when the voltage produced across the bridge circuit is of one polarity and the relay 170 is caused to operate when the voltage across the bridge circuit is of the other polarity. Batteries 172 and 174 are respectively connected to the winding of the motor 160 through the armatures of the respective relays 166 and 170.

Thus, each time that the bridge circuit is energized, the motor 160 is caused to rotate in a suitable direction so that the resistance of the resistor 156 is adjusted to be substantially equal to the resistance of the resistance element 150.

A battery 176 is employed to energize the bridge circuit when the armature of a switch 178 is caused to engage the back contact of the switch.

A clock 180 is employed to operate the switch 178 by means of its minute hand 182. The minute hand 182 actuates a control member 184, which is connected to the armature of the switch 178, during approximately one minute out of each hour.

The minute hand 182 also actuates a control member 186 which serves to move the armature of a switch 188 against the back contact of the switch during approximately one minute out of each hour.

An arm 190 of non-conductive material is connected to the shaft 158 of the motor 160 by means of a roller bearing. The arm 190 carries a pair of conductive brushes 192 and 194, a small motor 196 and a battery 193. The motor 196 serves to operate a worm 200 which engages a gear 202 which is rigidly secured to the shaft 158. The conductive brush 192 serves to contact a conductive slip ring 210 which is secured to the housing of the motor 160, and the conductive brush 194 serves to contact a conductive plate 216 when the arm 190 is adjacent thereto.

The motor 196 is employed to reset the arm 190 to the dotted line position shown in Fig. 8 each time that the armature of the switch 188 is caused to engage the back contact of the switch.

The gears 200 and 202 serve to lock the arm 190 to the shaft 158 while the motor 196 is not activated, and each time that the motor 160 is energized it causes the arm 190 to move in conformity with the movements of the shaft 158 of the motor.

When the minute hand 182 of the clock engages the member 186, the motor 196 is energized by the battery 193 through the circuit which comprises the brush 192, the slip ring 210, the armature of the switch 188 and the connection to the shaft 158 of the motor. Thus, the motor 196 causes the worm 200 to rotate until the electrical connection is broken when the brush 192 reaches the opening 212 in the slip ring 210, whereupon the motor 196 is de-energized and the arm 190 comes to rest in the dashed line position shown in Fig. 8. During this resetting operation the motor 160 is not energized and hence the setting of the adjustable resistor 156 is not disturbed.

When the minute hand 182 of the clock engages the member 184 the armature of the switch 178 is caused to rest against the back contact of the switch, thereby completing the electrical circuit between the battery 176 and the bridge circuit. Each time that the bridge circuit is energized the shaft 158 moves in a suitable direction until the adjustable resistor 158 has a resistance substantially equal to that of the element 150. Since the arm 190 is rigidly secured to the shaft 158 by means of the gears 200 and 202, the arm 190 is also caused to rotate in the desired direction. If the arm 190 is caused to rotate in a counter-clockwise direction so that the brush 194 comes to rest upon the conductive plate 216, a short circuit is provided across the output leads 76 as soon as the armature of the switch 178 is released so that it rests against the front contact of the switch. The short circuit is provided by the connection between the brush 194 and the plate 216, the released armature of the switch 178 and the released armature of the switch 188. This short circuit is maintained throughout the remainder of the hour until the minute hand 182 again contacts the member 186, whereupon the above described cycle of operation is repeated.

It is to be noted that the electrical connection between the member 216 and one of the output leads 76 is open during the periods when the armatures of the switches 178 and 188 engage the back contacts of the switches. This is to prevent a short circuit from being applied across the leads 76 while the arm 190 is being reset.

As shown in Fig. 8, the arm 190 is reset during the time interval between minutes :58 and :59. During the time interval between minutes :00 and :01 the minute hand 182 causes the bridge circuit to be energized and the motor 160 is caused to operate until the bridge is balanced. Each movement of the arm 190 corresponds to the movement of the control member of the adjustable resistor 156, which in turn represents the magnitude of the charge in the meteorological variable during the preceding hour. If the arm 190 comes to rest in a position so that the brush 194 contacts the plate 216, a short circuit is provided across the output leads 76 during the time interval between minutes :02 and :58. Thus, the apparatus shown in Fig. 8 may be employed as a sensing device to control the operation of the cloud seeding generator in the same manner as the sensing devices shown in Figs. 2 to 7. However, the apparatus shown in Fig. 8 is responsive only to the changes in the meteorological variables which occur during each hour.

The clock operated switching arrangement shown in Fig. 6 may be employed with any sensing device which requires a source of potential to energize the device and if all the devices of the sets of sensing devices are energized by means of a single source of potential, one clock operated switch may be employed to energize all of the devices during certain periods of time.

It will be apparent that the functions of both the sets of sensing devices A to K and A' to K' may be accomplished by means of one set of sensing devices provided each of the sensing devices is provided with separate means for providing a short circuit which will serve to turn the cloud seeding generator on and off when meteorological conditions are suitable for such control action.

I claim:

1. In a generator for producing cloud seeding nuclei wherein the nuclei are produced by the application of energy to a chemical, the combination comprising means for controlling said energy in response to predetermined electrical signals, and a sensing device coupled to the control means for the energy, the sensing device being responsive to a meteorological parameter and serving to produce a predetermined electrical condition when the meteorological parameter is within a certain range of values and serving to produce a different electrical condition for other values of the meteorological parameter.

2. The apparatus of claim 1 further including a source of potential for energizing the sensing device, a switch connected in series between the source of potential and the sensing device, and means for operating the switch during predetermined periods of time.

3. In a generator for producing cloud seeding nuclei wherein the nuclei are produced by the application of energy to a chemical, the combination comprising means for controlling said energy, and a plurality of sensing devices each of which is responsive to predetermined meteorological conditions and at least one of which is responsive only to changes in meteorological conditions with respect to time, the sensing devices being electrically connected to one another and to said control means for producing an electric signal for activating the control means.

4. In a generator for producing cloud seeding nuclei wherein the nuclei are produced by the application of energy to a chemical, the combination comprising means for controlling said energy, and a sensing device which is responsive to certain predetermined meteorological conditions coupled to the control means for providing control signals therefor.

5. The apparatus of claim 4, wherein the sensing device provides control signals solely in response to changes in meteorological conditions over predetermined periods of time.

6. The apparatus of claim 4, further including a source of potential for energizing the sensing device, a switch connected in series between the source of potential and the sensing device, and means for operating the switch during predetermined periods of time.

7. In a generator for producing cloud seeding nuclei wherein the nuclei are produced by the application of energy to a chemical, the combination comprising means for controlling said energy, a plurality of sensing devices connected in series for producing predetermined electrical conditions in an output circuit, the sensing devices being responsive to meteorological conditions and at least one of the sensing devices being responsive only to changes in meteorological conditions with respect to time, and means connected between the output circuit of the sensing devices and the control means for the energy for activating the control means in response to predetermined electrical conditions in the output circuit.

8. In a generator for producing cloud seeding nuclei wherein the nuclei are produced by the application of heat to a chemical, the combination comprising means for producing heat, means for conveying a chemical to the heat-producing means, at least one sensing device for producing predetermined electrical conditions at an output circuit in response to predetermined meteorological conditions, and means connected between said output circuit and the heat-producing means and the chemical-conveying means for controlling the heat-producing means and the chemical-conveying means in response to the electrical conditions produced at the output circuit.

9. In combination, a generator for producing cloud seeding nuclei, at least one sensing device responsive to predetermined meteorological conditions and having an output circuit for providing electrical conditions representative of the meteorological conditions, and control means connected between the output circuit and the generator for activating the generator in response to a predetermined electrical condition in the output circuit.

10. The apparatus of claim 9, wherein at least one sensing device provides electrical conditions solely in response to changes in meteorological conditions over predetermined periods of time.

11. In a generator for producing cloud seeding nuclei having a control means for activating the generator when a short circuit is connected across an input circuit thereof, a plurality of sensing devices each of which is responsive to meteorological conditions, each of the sensing devices having a pair of conductors which provide a short circuit when the sensing device responds to predetermined meteorological conditions, and means connecting the respective pairs of conductors of the sensing devices in series and connecting the serially connected conductors across the input circuit of the control means for the generator.

12. In a generator for producing cloud seeding nuclei, means for producing heat, means for conveying a chemical from which the nuclei are produced to the heat-producing means, an electric motor, a first crank connected to the shaft of the motor for controlling the heat-producing means and the chemical-conveying means, a source of potential, a pair of normally closed switches connected in series between the source of potential and the motor, a second crank connected to the shaft of the motor for operating the switches in sequence when the motor is energized, a plurality of sensing devices responsive to meteorological conditions and each of which has a pair of conductors which provide a short circuit when the sensing device responds to predetermined meteorological conditions, means connecting the respective pairs of conductors of the sensing devices in series, and means connecting the serially connected pairs of conductors in shunt with one of the switches of said pair of switches.

13. In a generator for producing cloud seeding nuclei having a pair of normally closed switches connected in series for respectively activating and de-activating the generator, a plurality of sensing devices each of which is responsive to meteorological conditions and each of which has a pair of conductors which provide a short circuit when the sensing device responds to predetermined meteorological conditions, means connecting the respective pairs of conductors in series with one another and connecting the serially connected conductors in shunt with the switch which serves to activate the generator, and means responsive to meteorological conditions and connected in shunt with the switch which serves to de-activate the generator for providing a short circuit in response to predetermined meteorological conditions.

14. The apparatus of claim 13, wherein at least one of the sensing devices is responsive only to changes in meteorological conditions over predetermined periods of time.

15. In a generator for producing cloud seeding nuclei and having a pair of switches for controlling the operation of the generator, a first control apparatus connected in shunt with one of said switches, and a second control apparatus connected in shunt with the other of said switches, the first and second control apparatus each comprising at least one sensing device which is responsive to meteorological conditions and which provides a short circuit when the sensing device responds to predetermined meteorological conditions.

16. In a generator for producing cloud seeding nuclei wherein the nuclei are produced by the application of energy to a chemical, the combination comprising means for controlling said energy in response to predetermined electrical conditions, a sensing element for providing an electrical condition which varies in accordance with variations in a meteorological parameter, adjustable means for providing a similar electrical condition, control means coupled to the sensing element and to the adjustable means for periodically causing the adjustable means to have substantially the same electrical condition as the sensing element, means for periodically resetting the control means to a reference condition without disturbing the setting of the adjustable means, and means coupled to the control means for the sensing element for providing a predetermined electrical condition for actuating said means for controlling the energy when the control means changes the adjustable means a predetermined amount.

17. In a generator for producing cloud seeding nuclei wherein the nuclei are produced by the application of energy to a chemical, the combination comprising means for controlling said energy in response to predetermined electrical conditions, a sensing element for providing an electrical condition which varies in accordance with a meteorological condition, adjustable means for providing a similar electrical condition, control means coupled to the sensing element and to the adjustable means for causing the adjustable means to have substantially the same electrical condition as the sensing element, means for activating the control means at predetermined times, means for resetting the control means to a reference condition at predetermined times without changing the electrical condition of the adjustable means, and means responsive to the operation of the control means for providing a predetermined electrical condition for actuating said means for controlling the energy when the control means changes the adjustable means a predetermined amount.

18. In a generator for producing cloud seeding nuclei wherein the nuclei are produced by the application of energy to a chemical, the combination comprising means for controlling said energy in response to predetermined electrical conditions, a sensing element for providing a resistance having a magnitude which varies in accordance with a meteorological condition, an adjustable resistor, control means coupled to the sensing element and having a movable member connected to the adjustable resistor for causing the adjustable resistor to have the same resistance as that of the sensing element, means for activating the control means at predetermined times, means for resetting the movable member to a reference position at predetermined times without changing the resistance of the adjustable resistor, and means coupled to the movable member for providing a predetermined electrical condition for actuating said means for controlling the energy when the movable member is caused to move a predetermined distance.

PAUL B. MacCREADY, Jr.

References Cited in the file of this patent

UNITED STATES PATENTS

| Number | Name | Date |
|---|---|---|
| 473,820 | Brown | Apr. 26, 1892 |
| 1,086,729 | Rey | Feb. 10, 1914 |
| 1,268,712 | Harle | June 4, 1918 |
| 1,928,963 | Chaffee | Oct. 3, 1933 |